United States Patent
Gunzelmann et al.

(10) Patent No.: US 7,089,025 B2
(45) Date of Patent: Aug. 8, 2006

(54) METHOD AND DEVICE FOR CONTROLLING COMBINED UMTS/GSM/EDGE RADIO SYSTEMS

(75) Inventors: Bertram Gunzelmann, Königsbrunn (DE); Berndt Pilgram, München (DE); Dietmar Wenzel, München (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/993,337

(22) Filed: Nov. 19, 2004

(65) Prior Publication Data

US 2005/0069069 A1     Mar. 31, 2005

Related U.S. Application Data

(63) Continuation of application No. PCT/DE03/01555, filed on May 14, 2003.

(30) Foreign Application Priority Data

Jun. 4, 2002   (DE) ............................... 102 24 798

(51) Int. Cl.
*H04B 7/005*   (2006.01)

(52) U.S. Cl. ..................... 455/502; 375/354
(58) Field of Classification Search ........... 455/426.2, 455/550.1, 414.1, 448, 502, 13.2, 436, 439, 455/442, 561, 446, 550; 375/354; 370/342, 370/338, 334

See application file for complete search history.

(56) References Cited

U.S. PATENT DOCUMENTS

| | | | |
|---|---|---|---|
| 5,590,133 A * | 12/1996 | Billstrom et al. | 370/349 |
| 5,710,766 A * | 1/1998 | Schwendeman | 370/329 |
| 6,130,886 A * | 10/2000 | Ketseoglou et al. | 370/347 |
| 6,785,352 B1 * | 8/2004 | Ranta | 375/354 |

FOREIGN PATENT DOCUMENTS

| | | |
|---|---|---|
| DE | 198 51 600 A1 | 6/2000 |
| DE | 198 56 401 A1 | 6/2000 |
| DE | 199 54 594 A1 | 6/2001 |
| EP | 0 966 116 A2 | 6/1999 |
| EP | 1 271 977 A1 | 6/2002 |
| WO | WO 00/27151 | 5/2000 |
| WO | WO 02/01887 | 6/2001 |

* cited by examiner

Primary Examiner—Edward F. Urban
(74) Attorney, Agent, or Firm—Baker Botts L.L.P.

(57) ABSTRACT

In a method for controlling radio systems designed for transmission/reception of signals based on at least two radio standards with different time patterns, with signals based on one of these radio standards being processed in each radio system, at least one synchronization signal is produced in the first and/or second radio system for synchronization, respectively, is transmitted to the respective other radio system and system information associated with that particular radio system is in each case stored in that radio system to which the synchronization signal is transmitted. The stored system information can be read by the respective other radio system via an interface, and times for transmission of signals can be calculated by means of the information which has been read. The transmission of signals or the production of events in a radio system can be enabled or inhibited by means of a signal from the other radio systems.

20 Claims, 2 Drawing Sheets

METHOD AND DEVICE FOR CONTROLLING COMBINED UMTS/GSM/EDGE RADIO SYSTEMS

CROSS REFERENCE TO RELATED APPLICATION

This application is a continuation of copending International Application No. PCT/DE03/01555 filed May 14, 2003 which designates the United States, and claims priority to German application no. 102 24 798.6 filed Jun. 4, 2002.

TECHNICAL FIELD OF THE INVENTION

The invention relates to a method for controlling radio systems in a radio station, in particular a mobile radio station, with the radio station being designed for transmission/reception of signals based on at least two radio standards with different time patterns. The invention furthermore relates to an apparatus for controlling radio systems in a radio station.

DESCRIPTION OF RELATED ART AND BACKGROUND OF THE INVENTION

A large number of actions have to be initiated and control signals produced in transmitting and receiving devices in mobile stations, and these are correlated in time with a special time pattern, which is specific to the mobile radio standard.

A number of different standards have become established in the mobile radio field in recent years, and have been developed further or will be replaced by new standards in the future. Known examples of mobile radio standards are GSM (Global System for Mobile Communication), the 8 PSK (8-Phase Shift Keying) further development of GSM which is referred to as the EDGE (Enhanced Data Services for GSM Evolution) Standard, and various standards based on the CDMA (Code Division Multiple Access) transmission method such as UMTS (Universal Mobile Telecommunication System). Another radio standard for the fourth generation is currently already being developed as the MBS (Mobile Broadband System).

The requirements for mobile stations for mobile radio are growing with the presence of different and competing standards. Mobile stations which can support two or more mobile radio systems or standards at the same time are desired. This is dependent on the mobile station being able to produce the different time patterns for the individual standards, and being able to carry out suitable event control processes based on them.

The transmission methods, for example CDMA and TDMA, for these two different mobile radio standards are based on different symbol clock frequencies, with the transmitted data normally being structured in transmission frames, which each have a predetermined length. This structure and/or length of each transmission frame in a continuous signal sequence is predetermined, and is identified by the mobile station. The mobile station has to align its time sequence control to this structure. One difficulty that occurs in this case is that different mobile radio standards use generally incommensurable time patterns, that is to say the time patterns can generally not be changed to one another by simple clock division. Particularly in cellular mobile radio systems, the mobile station also has to carry out further functions other than the transmission and reception of data, which cannot be carried out at the same time, at least during operation of only a single receiving device. By way of example, a mobile station which supports two or more mobile radio standards, in a cellular radio communications system in which the base stations in different cells transmit at different frequencies has to measure, from time to time, whether it can receive radio signals from a different base station with sufficient reception quality. To do this, the mobile station sets its receiving device to a different frequency than that frequency at which it is currently receiving data. The data is in this case sent, for example using a UMTS system, from a base station to a receiving mobile station by interrupting the transmission at predetermined times such that it is possible for the receiving mobile station to carry out other functions, such as an adjacent channel search (search for specific data packets which are transmitted from an adjacent base station) during one or more interruption phases and, in particular, also to carry out measurements. In order to avoid loss of data, the base station transmits its data in advance at a higher transmission rate than the generally constant continuous transmission rate. In order that this increased transmission rate does not lead to higher bit error rates, the transmission power is also increased during this time period in which data is being transmitted at an increased transmission rate.

The frequency with which interruption phases are repeated as well as the time duration of the interruption phases depend on the respective radio system, and also on the respective operating mode of this radio system. One disadvantage in this case is that, as the number of inserted interruption phases increases, the transmission power on the one hand becomes higher, and the transmission quality on the other hand deteriorates.

SUMMARY OF THE INVENTION

The object of the invention is to provide a method and an apparatus for controlling radio systems in a radio station, by means of which the effort for synchronization to different time patterns can be minimized.

In a method according to the invention for controlling radio systems in a radio station, in particular a mobile radio station, the radio station supports at least two radio standards with different time patterns. Signals for one radio standard are processed in each of the radio systems. At least one synchronization signal is in each case produced in the first and/or second radio system, and the synchronization signal is transmitted to the respective other radio system. The system information for synchronization of the radio systems for that particular system is in each case stored in that radio system to which the synchronization signal is transmitted from the other radio system.

It is advantageous for the time at which the storage of system information in one of the radio systems starts to be determined by the other radio system by means of the synchronization signal. The storage of system information in the other radio system can in this way be initiated accurately at defined times in the first radio system.

In one preferred exemplary embodiment, the synchronization signal which is produced by one radio system is passed to a control unit, in particular a time control unit, in the other radio system, and the system information is stored in a memory unit in this control unit. The synchronization signals for each radio system are advantageously produced in a respective signal generator, in particular a synchronization signal generator. This signal generator and the production of the synchronization signal in a radio system are preferably controlled by the control unit which is associated with this radio system. This means that the radio systems, in particular the respective control units, can be synchronized quickly and in a simple manner.

In one particularly preferred exemplary embodiment, the system information (which is stored in the second radio system at a time which is predetermined by the first radio system) for the second radio system is read by the first radio system, and times for interchanging data between the radio station and other stations can advantageously be determined from signals from the first radio system by means of this system information, which has been read from the second radio system, in the first radio system. This means that a radio system transmission phase which is characterized by the system information can be checked by the other radio system at times defined by this other radio system. The start and/or the end of an interruption phase in the radio system being checked can thus be determined by the checking radio system.

The frame number of the transmission frame for transmission of data and/or a number of a time slot which is allocated to a transmission frame and/or the number of a unit into which a time slot is subdivided are/is advantageously stored as system information.

In one advantageous exemplary embodiment, a second synchronization signal is in each case produced in the first and/or in the second radio system. This second synchronization signal is passed to the respective other radio system, and the transmission of radio signals or the production of events in the radio system to which the second synchronization signal is passed is enabled or inhibited in this respective other radio system at a time which can be predetermined by the applied second synchronization signal in the radio system which produces this second synchronization signal. This makes it possible to achieve optimum frequency control of synchronization processes and optimum event control for the radio systems. This makes it possible to prevent both radio systems from transmitting signals at the same time.

It is advantageous if the second synchronization signals are produced in the respective signal generators in the radio systems, and are passed to the signal generators in the respective other system. It is also possible to provide for the first and second synchronization signal in a radio system to be combined to form a simple synchronization signal, and for the information for synchronization on the information for enabling or inhibiting a transmission process to be coded. This means that the initiation of a storage process for system information and the enabling or inhibiting of a transmission process in a radio system at the same time can be controlled by the other radio system by means of a single signal.

The method is particularly advantageous if the radio station supports the two mobile radio standards UMTS and GSM/EDGE.

An apparatus according to the invention for controlling radio systems in a radio station, in particular a mobile radio station, with the radio station being designed for transmission/reception of signals based on at least two radio standards with different time patterns, has a first control unit, in particular a first time control unit and a first signal generator, which is connected downstream from this first control unit, in particular a first synchronization signal generator. This first control unit and this first signal generator are allocated to the first radio system in order to produce at least one first synchronization signal for the first radio system. A second control unit in particular a second time control unit, and a second signal generator which is connected downstream from this second control unit, in particular a second synchronization signal generator, are allocated to the second radio system in order to produce at least one first synchronization signal for the second radio system. The first and the second control unit each have at least one memory unit. The first signal generator is electrically connected to the second radio system, and the second signal generator is electrically connected to the first radio system. The apparatus according to the invention allows the radio systems to be synchronized and, if appropriate, the interruption phases in the radio systems to be minimized in terms of the time duration and the number of them.

At least in one radio system, the control unit advantageously has a second memory unit, in which case system information for the data reception path can be stored in the first memory unit in this control unit, and system information relating to the data transmission path can be stored in this second memory unit. This allows the system information for the data reception path and for the data transmission path in a radio system to be stored separately.

In one preferred exemplary embodiment, the first signal generator is connected to the first input of the second signal generator and to the second control unit for the second radio system. In particular, in this case it has an electrical connection at least to the first memory unit in the second radio system. The second signal generator is electrically connected to one input of the first signal generator and to the first control unit for the first radio system, in particular at least to the first memory unit for the first radio system. By means of appropriate control signals, in particular synchronization signals it is thus possible for the second signal generator to be activated or deactivated by means of the first signal generator or for the first signal generator to be activated or deactivated by the second signal generator, or for system events in the first radio system to be enabled or inhibited by means of the second signal generator, or for system events in the second radio system to be enabled or inhibited by the first signal generator.

It is advantageous for the radio systems to be connected by means of an electrical connection, in particularly a synchronous serial interface, via which system information, in particular the contents of the memory units in one radio system can be read and evaluated by the other radio system. This makes it possible for one radio system to simply determine the start or the end of an interruption phase in the other radio system.

BRIEF DESCRIPTION OF THE DRAWINGS

One exemplary embodiment of the invention will be explained in more detail in the following text with reference to schematic drawings, in which.

DETAILED DESCRIPTION OF EMBODIMENTS

Figure 1:
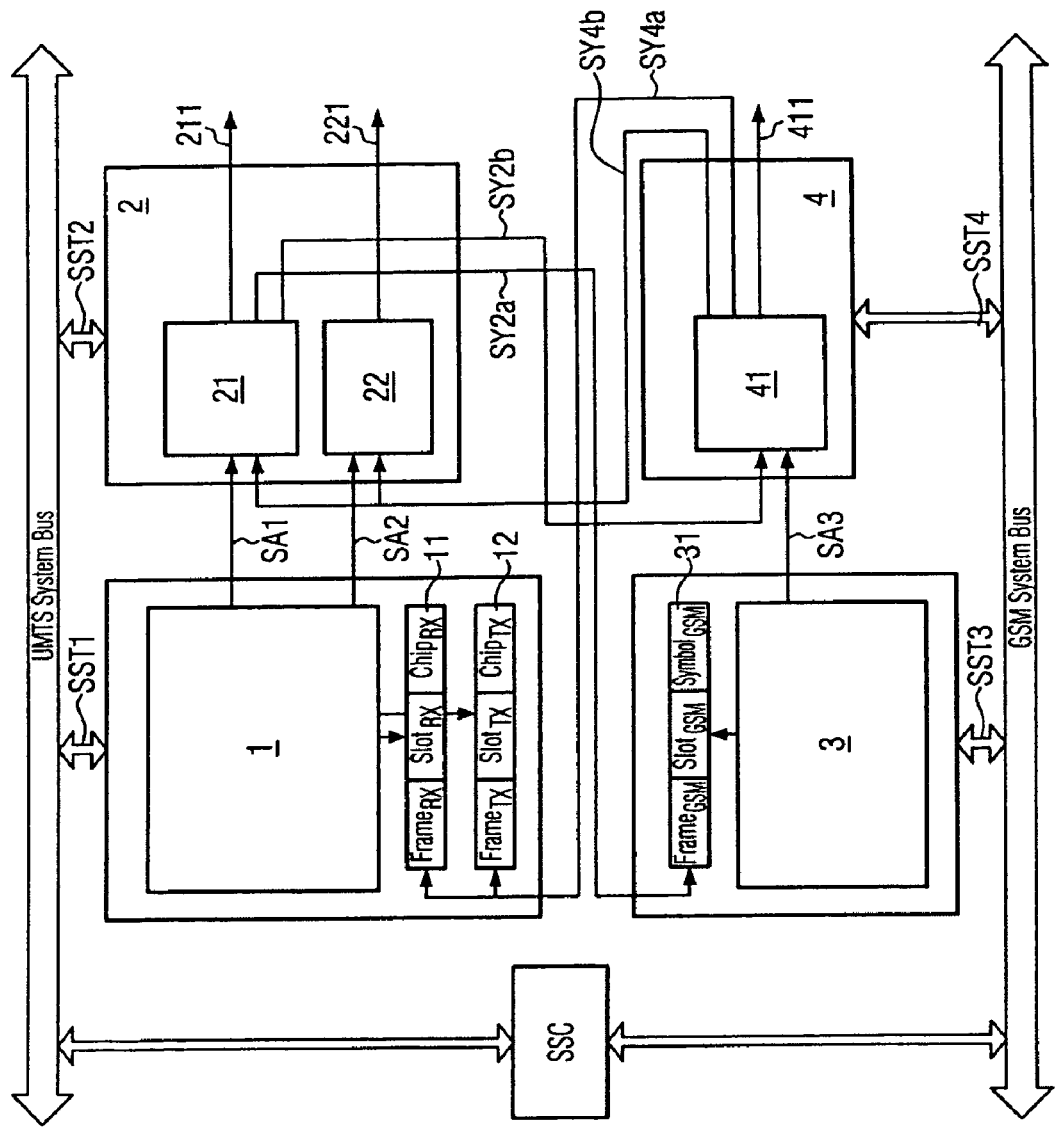
FIG. 1 shows a block diagram of an apparatus according to the invention.

The apparatus according to the invention and the method according to the invention are described in the exemplary embodiment on the basis of a mobile station which supports the two mobile radio standards UMTS and GSM/EDGE. The apparatus according to the invention has a UMTS time control unit 1, which is connected to memory units 11 and 12. The UMTS time control unit 1 and the two memory units 11 and 12 are electrically connected to the UMTS bus system via an interface SST1. The UMTS time control unit 1 controls a downstream signal generator which, in the exemplary embodiment, is in the form of a synchronization signal generator 2. The synchronization signal generator 2 has a unit 21 in which events are produced for the UMTS transmission path. The unit 21 is controlled by the control signal SA1 from the UMTS time control unit 1. Furthermore, the synchronization signal generator 2 has a unit 22 for production of events for the UMTS reception path, which is controlled by a control signal SA2 from the UMTS time control unit 1. The synchronization signal generator 2 is electrically connected to the UMTS bus system via an interface SST2. The UMTS time control unit 1, the memory units 11 and 12 and the synchronization signal generator 2, together with its units 21 and 22, are associated with the UMTS radio system.

Furthermore, the apparatus has a GSM time control unit 3 which is connected to a memory unit 31. The GSM time control unit 3 and the memory unit 31 are electrically connected to the GSM bus system via an interface SST3. The apparatus has a second signal generator which, in the exemplary embodiment, is in the form of a synchronization signal generator 4 with a unit 41 for production of the events for the GSM transmission path and GSM reception path. The second synchronization signal generator 4 is connected to the GSM bus system via an interface SST4. The synchronization signal generator 4 or the unit 41 is controlled by the GSM time control unit 3 via a control signal SA3. The GSM transmission path or GSM reception path events which are produced in the unit 41 are transmitted by means of the signal 411. The synchronization signal generator 4 or the unit 41 produces a first synchronization signal SY4$a$, which is passed to the memory units 11 and 12 for the UMTS radio system. The unit 41 produces a second synchronization signal SY4$b$, which is passed to the units 21 and 22 in the synchronization signal generator 2 for the UMTS radio system. The UMTS transmission path events which are produced in the unit 21 are transmitted via the signal 211. The UMTS reception path events which are produced by the unit 22 are transmitted by the signal 221. The unit 21 produces a first synchronization signal SY2$a$ for the UMTS radio system, which is passed to the memory unit 31 for the GSM radio system. The unit 21 produces a second synchronization signal SY2$b$, which is passed to one input of the synchronization signal generator 4 or of the unit 41.

The apparatus furthermore has a synchronous serial connection SSC, by means of which the GSM radio system can read the contents of the memory units 11 and 12 for the UMTS system, while the UMTS system can read the contents of the memory unit 31 for the GSM radio system. System information for the reception path of the UMTS system is stored in the memory unit 11 for the UMTS system, and system information for the transmission path of the UMTS system is stored in the memory unit 12. System information for the GSM system is stored in the memory unit 31 for the GSM system. In the exemplary embodiment, the memory units 11, 12 and 31 are illustrated as separate external memory units. It is also possible for the memory units 11 and 12 to be arranged in the UMTS time control unit 1, and/or for the memory unit 31 to be arranged in the GSM time control unit 3.

In the exemplary embodiments, the frame number of the transmission frame for transmission of data Frame$_{RX}$, Frame$_{TX}$, a number of a time slot Slot$_{RX}$, Slot$_{TX}$ which is associated with the corresponding transmission frame Frame$_{RX}$ or Frame$_{TX}$, respectively, and into which a transmission frame is subdivided, as well as the chip numbers Chip$_{RX}$, Chip$_{TX}$ into which the time slots Slot$_{RX}$ and Slot$_{TX}$, respectively, are divided, are stored as system information in the memory units 11 and 12 in the UMTS radio system. The frame number Frame$_{GSM}$ of the data transmission frame, the number of a time slot Slot$_{GSM}$ which is associated with the transmission frame Frame$_{GSM}$ as well as the GSM symbol number Symbol$_{GSM}$ into which the time slot Slot$_{GSM}$ is subdivided are stored as system information for the GSM radio system in the memory unit 31. Passing the first synchronization signal SY4$a$ from the synchronization signal generator 4 to the memory units 11 and 12 results in the UMTS system information for the reception path and for the transmission path, respectively, being stored in the respective memory units 11 and 12 at a time which is predetermined by the GSM system. This first synchronization signal SY4$a$ is generated in the synchronization signal generator 4 or in the unit 41 at a specific GSM time, which is identified by the system information in the GSM system relating to this time. The second synchronization signal SY4$b$ is generated in the unit 41 in the signal generator 4 at the same time, or at a different time, in order to produce the first synchronization signal SY4$a$. This second synchronization signal SY4$b$ in the GSM system is passed to the units 21 and 22 in the signal generator 2 for the UMTS system. UMTS events which have been combined in a group and are produced in the units 21 and 22 are enabled or inhibited by means of this synchronization signal SY4$b$. This allows UMTS events to be enabled or inhibited at specific GSM times.

Passing the first synchronization signal SY2$a$, which is produced in the unit 21 in the signal generator 2 in the UMTS system, to the memory unit 31 results in the GSM system information being stored in the memory unit 31 for a specific UMTS time. In consequence, the GSM system information is stored for a specific UMTS time, which is identified by the system information in the UMTS system relating to this time. The second synchronization signal SY2$b$ is produced by the unit 21 and is passed to the unit 41 in the synchronization signal generator 4 at the same time or at a different time in order to produce the first synchronization signal SY2$a$ for the UMTS system. GSM events which have been combined in a group are enabled or inhibited by means of the second synchronization signal SY2$b$ in the UMTS system. Those UMTS events and GSM events which have been enabled or inhibited by the synchronization signals SY4$b$ and SY2$b$, respectively, can be combined into groups by respective special markings. Passing the second synchronization signal SY2$b$ to the synchronization signal generator 4 in the GSM system allows, for example, the transmission of signals to be prevented in the GSM system. This ensures that the GSM system cannot transmit signals in an interruption phase during a measurement of a UMTS base station.

After the completion of a measurement process of a UMTS base station, the transmission of signals in the GSM system can be enabled once again by the synchronization signal SY2$b$. This allows GSM events to be enabled or inhibited by the UMTS system at defined UMTS times, without the GSM system needing to know the precise UMTS time, which is identified by the UMTS system information relating to this time. GSM events can thus be enabled or inhibited with respect to the UMTS transmission path at specific UMTS times.

These statements relating to the synchronization signal SY2$b$ also apply in an analogous manner to the synchronization signal SY4$b$ for the GSM signal.

It is also possible to provide for the synchronization signals SY2$a$ and SY2$b$ for the UMTS system to be combined to form a single synchronization signal. The information which is contained in the separate synchronization signals SY2a and SY2b must be coded when a single synchronization signal is present in the UMTS system. It is likewise possible for the two synchronization signals SY4a and SY4b for the GSM system to be combined to form a single synchronization signal, and for the information which is contained in the individual synchronization signals SY4a and SY4b, respectively, to be coded.

Figure 2:
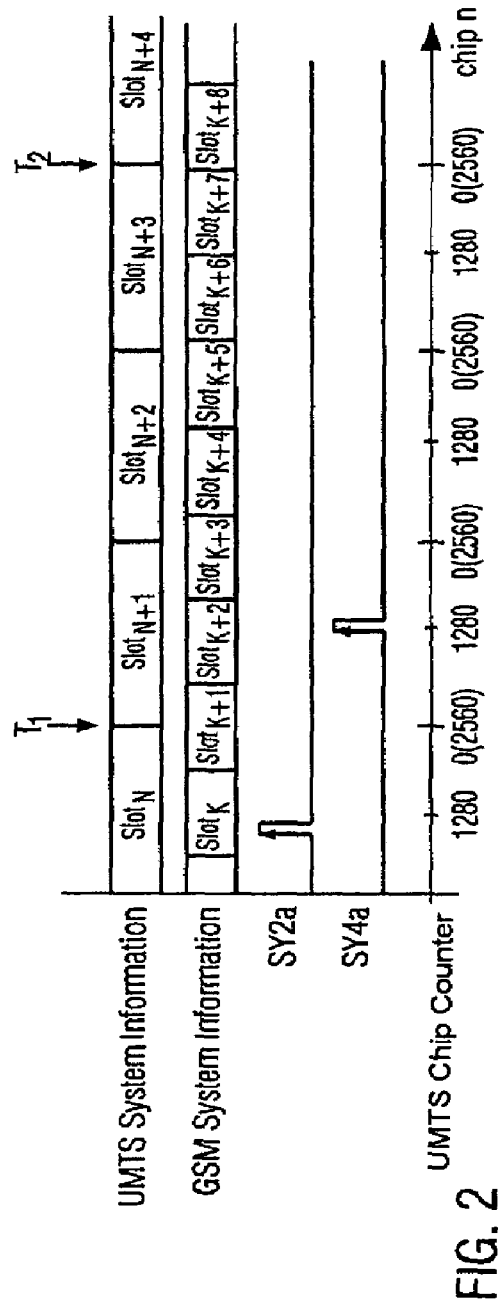
FIG. 2 shows a timing diagram of a process for storing system information.

FIG. 2 shows a timing diagram for a process for storing the UMTS system information relating to a specific GSM time, as well as a process for storing GSM system information relating to a specific UMTS time. In this case the illustration shows in particular the process of storing the UMTS system information by means of the synchronization signal SY2a, and for storing the GSM system information by means of the synchronization signal SY4a. The timing diagram shown in FIG. 2 shows UMTS/GSM synchronization during a UMTS interruption phase, whose start is identified by the time $T_1$, and whose end is identified by the time $T_2$. The UMTS system information is provided by the frame number of the transmission frame, the number of the time slot and the number of a chip, and is illustrated in the figure by the time slot numbers $Slot_N$, $Slot_{N+1}$ to $Slot_{N+4}$ with the correspondingly finer subdivision into chips with 2560 chips per time slot. The GSM system information, which is independent of the UMTS system information and is based on a different symbol plot frequency, is likewise provided by frame numbers for the transmission frames, the time slot numbers and the symbol number, and is illustrated in the timing diagram in FIG. 2 by time slot numbers $Slot_K$, $Slot_{K+1}$ to $Slot_{K+8}$, with the likewise correspondingly finer subdivision into symbols with 156.25 symbols per time slot or slot. The synchronization pulse SY2a illustrates the transfer of the UMTS system information (frame, time slot and chip number) to the memory unit 12 in the UMTS time control unit 1. In a corresponding manner, the synchronization pulse in the synchronization signal SY4a illustrates the transfer or the storage of the GSM system information (frame, time slot and symbol number) in the memory unit 31 in the GSM time control unit 3. This means that both the GSM system and the UMTS system read the system information for the respective other system, in particular by means of the serial synchronous connection SSC, and can then calculate this in advance by software. As is shown by way of example in the timing diagram in FIG. 2, the GSM system can calculate the time $T_2$ for the UMTS interruption phase in advance from the UMTS system information that is stored for a specific GSM time.

Figure 3:
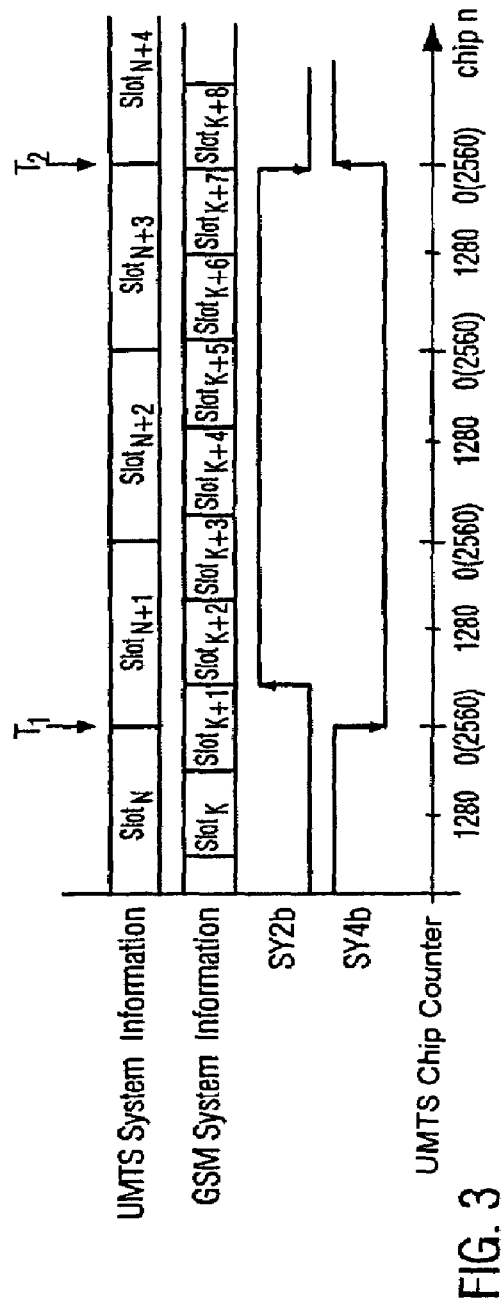
FIG. 3 shows a timing diagram for enabling or inhibiting system events.

FIG. 3 shows a timing diagram illustrating the method of operation of UMTS events, which have been combined into groups, by the GSM time control unit 3, and of GSM events by the UMTS time control unit 1. The UMTS system information and the GSM system information correspond to the information in FIG. 2. The synchronization signals SY2b and SY4b operate as follows. In the illustrated exemplary embodiment, the synchronization signal SY2b enables a group of UMTS events in the GSM $Slot_K$ and in the GSM $Slot_{K+1}$. Since the synchronization signal SY2b changes from a low level to a high level, a group of UMTS events from the GSM $Slot_{K+2}$ to the GSM $Slot_{K+7}$ is inhibited during the UMTS interruption phase in the time period between $T_1$ and $T_2$. A further change in the level of the synchronization signal SY2b once again enables this group of UMTS events in the GSM $Slot_{K+8}$. The level states of the synchronization signal SY4b which is illustrated in the exemplary embodiment results in a group of GSM events being inhibited before the time $T_1$ and after the time $T_2$. A group of GSM events is enabled from the UMTS $Slot_{N+1}$ to the UMTS $Slot_{N+3}$ during the time period of the UMTS interruption phase.

The apparatus according to the invention and the method according to the invention allow optimum sequence control of synchronization processes before, during and after UMTS/GSM interruption phases in combined UMTS/GSM mobile stations. For sequence control of synchronization processes and for event control, the UMTS system uses a time control unit 1 based on UMTS system information, where the GSM system uses a time control unit 3 based on the GSM system information. The respective UMTS system information is transmitted to the GSM system, and the respective GSM system information is transmitted in a corresponding manner to the UMTS system. The UMTS synchronization signals SY2a, SY2b and the GSM synchronization signals SY4a, SY4b respectively, as well as the memory units 11, 12, 31 allow the GSM system information and the UMTS system information, respectively, to be stored, and the checking of GSM events and UMTS events, respectively, which have been combined into groups to be carried out at accurate times, in order to make it possible to optimally monitor the sequence control of synchronization processes before, during and after UMTS/GSM interruption phases. This means that specially identified UMTS events (group) can be enabled or inhibited by the GSM time control unit 3, or specially identified GSM events (group) can be enabled or inhibited by the UMTS time control unit 1. Particularly when the UMTS system and the GSM system are being operated at the same time, that is to say before, during and after UMTS interruption phases by the GSM system, and before, during and after GSM interruption phases by the UMTS system, the GSM system must know the UMTS system information, and the UMTS system must know the GSM system information. This makes it possible to guarantee optimum sequence control of the UMTS and GSM synchronization processes and, for example, to avoid the UMTS system and the GSM system transmitting at the same time in a combined UMTS/GSM mobile station. The method according to the invention and the apparatus according to the invention can be used independently of the respective symbol clock frequencies and physical working clocks that are used in the UMTS system and in the GSM system.

We claim:

1. A method for controlling radio systems in a radio station with the radio station comprising at least two radio systems each comprising a synchonization signal generator, the radio systems being designed to transmit/receive signals based on at least two radio standards with different time patterns, the method comprising the steps of:
   processing signals based on a first and second radio standard in each radio system,
   producing first and second synchronization signals by the synchronization signal generators when operating in said first and/or second radio standard for synchronization of the radio systems,
   transmitting the first and second synchronization signals to the second and first radio system, respectively, and
   storing suitable system information in each case in that radio system upon receipt of the synchronization signal.

2. The method as claimed in claim 1, wherein the time at which the storage of the system information in one of the radio systems starts is predetermined by the other radio system by means of the first or second synchronization signal.

3. The method as claimed in claim 1, wherein the first or second synchronization signal which is produced by a radio system is passed to a control unit, in particular a time control unit in the other radio system, and the system information is stored in a memory unit in the control unit.

4. The method as claimed in claim 1, wherein the first or second synchronization signal for a radio system is produced in a signal generator.

5. The method as claimed in claim 4, wherein the signal generator and the production of the first or second synchronization signal are controlled by the control unit for the respective radio system.

6. The method as claimed in claim 1, wherein the system information for the second radio system is read by the first radio system, wherein the system information is stored in the second radio system at a time which is predetermined by the first radio system.

7. The method as claimed in claim 6, wherein times for interchanging data between the radio station and other stations are determined from signals from the first radio system by means of this system information, which has been read from the second radio system, in the first radio system.

8. The method as claimed in claim 1, wherein the frame number of a data transmission frame and/or a number of a time slot are/is allocated as system information to one data transmission frame, and/or the number of a unit into which a time slot is subdivided is stored.

9. The method as claimed in claim 1, wherein a third and fourth synchronization signal is produced in the first and second radio system, respectively, the third and fourth synchronization signal is fed to the synchronization signal generator of the respective other radio system, and the transmission of a radio signal or the production of an event in the radio system to which the third or fourth synchronization signal is passed is enabled or inhibited in this respective other radio system at a time which can be predetermined by the applied third or fourth synchronization signal in the radio system which produces this third or fourth synchronization signal.

10. The method as claimed in claim 9, wherein the third or fourth synchronization signals are produced in the respective signal generators in the radio systems, and are passed to the signal generators in the respective other system.

11. The method as claimed in claim 9, wherein two synchronization signals in each radio system are combined to form a single signal, and the information for synchronization and the information for enabling or inhibiting a transmission process or an event is coded.

12. The method as claimed in claim 10, wherein two synchronization signals in each radio system are combined to form a single signal, and the information for synchronization and the information for enabling or inhibiting a transmission process or an event is coded.

13. The method as claimed in claim 1, wherein the system information items for both the transmission path and the reception path in a radio system are stored, in particular separately from one another.

14. The method as claimed in claim 1, wherein the first radio standard is the UMTS mobile radio standard, and the second radio standard is the GSM/EDGE mobile radio standard.

15. An apparatus for controlling radio systems in a radio station, in particular a mobile radio station, with the radio station being designed for transmission/reception of signals based on at least two radio standards with different time patterns, comprising:
 a first control unit and a first synchronization signal generator which is connected downstream from the first control unit and is associated with the first radio system, in order to produce at least one first synchronization signal for the first radio system,
 a second control unit and a second synchronization signal generator, which is connected downstream from the second control unit and is associated with the second radio system, in order to produce at least one second synchronization signal for the second radio system,
 the first and the second control unit each have at least one memory unit, and
 the first synchronization signal is fed to the second control unit and the second synchronization signal is fed to the first radio control unit.

16. The apparatus as claimed in claim 15, wherein, at least in one radio system, the control unit has a second memory unit and system information relating to the data reception path can be stored in the first memory unit, and system information relating to the data transmission path can be stored in the second memory unit.

17. The apparatus as claimed in claim 15, wherein the first signal generator further generates a second synchronization signal of the first radio system which is fed to the second signal generator for the second radio system, and the second signal generator further generates a second synchronization signal of the second radio system which is fed to the first signal generator for the first radio system.

18. The apparatus as claimed in claim 16, wherein the first signal generator further generates a second synchronization signal of the first radio system which is fed to the second signal generator for the second radio system, and the second signal generator further generates a second synchronization signal for the second radio system which is for to the first signal generator for the first radio system.

19. The apparatus as claimed in claim 15, wherein the radio systems are connected by means of an electrical connection, in particular a synchronous serial interface, via which system information, in particular the contents of the memory units for one radio system can be checked by the other radio system.

20. The apparatus as claimed in claim 15, wherein the control unit and the at least one first memory unit in the first radio system are connected by means of an interface to the bus system for the first radio system, and the second control unit and the at least first memory unit in the second radio system are connected by means of a further interface to the bus system for the second radio system.

* * * * *